Dec. 3, 1963   D. N. BROWN ETAL   3,113,009
METHOD OF MAKING AND TREATING A SEMICRYSTALLINE CERAMIC BODY
Filed Oct. 17, 1958
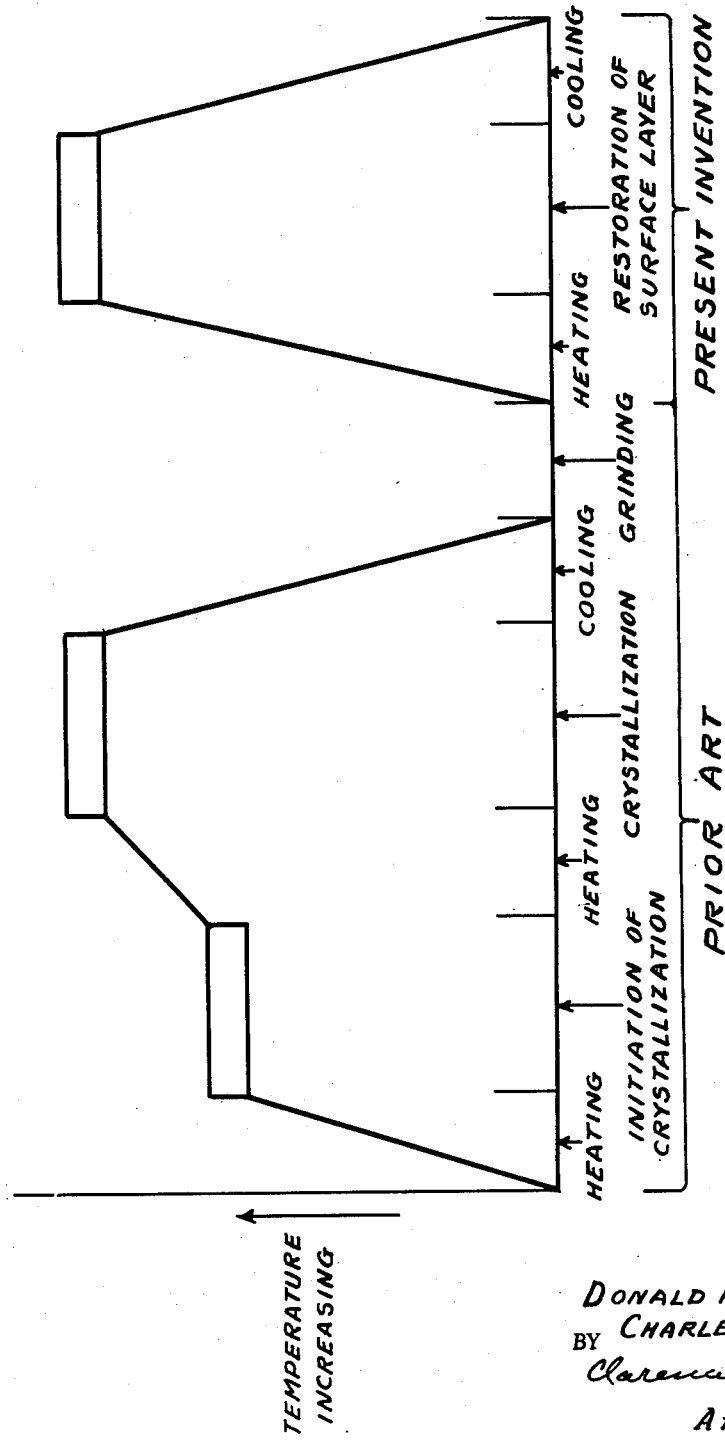
INVENTORS
DONALD N. BROWN AND
BY CHARLES B. KING
Clarence R. Patty, Jr.
ATTORNEY United States Patent Office 3,113,009
Patented Dec. 3, 1963

3,113,009
METHOD OF MAKING AND TREATING A SEMI-CRYSTALLINE CERAMIC BODY
Donald N. Brown and Charles B. King, Corning, N.Y., assignors to Corning Glass Works, Corning, N.Y., a corporation of New York
Filed Oct. 17, 1958, Ser. No. 767,786
3 Claims. (Cl. 65—33)

This invention relates to the production of semicrystalline ceramic bodies resulting from the controlled crystallization of glass bodies by heat treatment and particularly to a novel method of making such a body having predetermined highly accurate dimensions together with a relatively high modulus of rupture, sometimes called flexural strength, and a relatively low linear thermal expansion coefficient.

Methods of making semicrystalline ceramic bodies by the crystallization of glass bodies are disclosed and claimed in pending applications Serial Numbers 588,994, now Patent No. 2,920,971, and 718,398 filed June 4, 1956 and March 3, 1958, respectively, by Stanley D. Stookey. Such methods in general comprise preliminarily heating the glass body in a temperature range near its annealing point to initiate the crystallization thereof and finally heating it in a higher temperature range for a time sufficient to bring about the desired degree of crystallization. Bodies so made are characterized in general by higher moduli of rupture and deformation temperatures than those of the original glass and their expansion coefficients differ substantially from those of the glass.

Substantial variations in composition and/or heat treatment cause substantial variations in the moduli of rupture, expansion coefficients and amount of deformation of the semicrystalline products and it is sometimes necessary to compromise and accept less than the optimum value of one or more properties in order to obtain a desired optimum value of another property. A heat treatment which will produce the maximum modulus of rupture will usually cause a deformation of the body sufficient to make it unsuitable for purposes requiring a relatively small tolerance in dimensions or a close fit with other parts. On the other hand a heat treatment which will crystallize the same glass body without appreciable deformation thereof will not produce a modulus of rupture and expansion coefficient suitable for some other purpose without becoming economically impractical with respect to fuel cost, time and overhead expense.

Although such semicrystalline bodies having initial flat, cylindrical or other desirable shapes but having suffered objectionable deformation during their heat treatments can be suitably provided with predetermined accurate dimensions by grinding, it has been found that grinding or otherwise cutting through their surface layers usually weakens their inntrinsic mechanical strength and substantially diminishes their moduli of rupture.

The drawing illustrates the steps of the present invention and shows their relationship to the prior art as evidenced by the aforementioned patent and application.

It is an object of this invention to provide a method whereby the above-mentioned difficulties can be overcome and a semicrystalline body can be made which has exact predetermined dimensions together with a high modulus of rupture and a low expansion coefficient.

The new method broadly comprises preliminary heating a glass body in a temperature range in the neighborhood of and above its annealing point to initiate the crystallization thereof and finally heating it in a substantially higher temperature range for a time sufficient to bring about adequate crystallization of the body and to form a compression layer on its surface, thereafter grinding its surface to provide the body with predetermined accurate dimensions and at least partially to remove said compression layer thereby lowering its modulus of rupture, and then reheating it in said final temperature range for a time sufficient to restore its strength without substantially changing its dimensions.

The drawing qualitatively illustrates the heat-treatment steps of the prior art method of producing a semicrystalline body from a glass body which comprises the steps of:
 (1) Heating the glass body to a temperature range in the neighborhood of and above its annealing point;
 (2) heating the body in such temperature range to initiate crystallization thereof;
 (3) heating the body to a substantially higher temperature range;
 (4) heating the body in such temperature range to cause crystallization thereof;
 (5) cooling the body from such temperature range;
 (6) grinding the surface of the body to provide the body with predetermined accurate dimensions and at least partially remove the compression layer; and furthermore shows the relationship thereto of the present invention which comprises;
 (7) reheating the ground body to the temperature range previously utilized to complete crystallization of the body;
 (8) maintaining the body in said temperature range to restore the strength of the body; and
 (9) thereafter cooling the body.

Compositions which always form surface compressional layers during crystallization and for which the new method is particularly effective, include compositions comprising by weight 55–75% $SiO_2$, 3–7% $TiO_2$, 2–15% $Li_2O$ and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%, as described in the aforementioned application Serial No. 718,398. Said application shows that a glass body having a composition within such ranges can be converted to a semicrystalline body by preliminarily heating it between 650° and 800° C. to initiate crystallization thereof and then heating it between 800° and 1175° C. for 1–4 hours.

A specific composition within such range of compositions, which is particularly suitable for use with the new method and the use of which will illustrate the preferred embodiment of the invention, consists essentially of about 71% $SiO_2$, 2.5% $Li_2O$, 18% $Al_2O_3$, 4.5% $TiO_2$, 3% MgO and 1% ZnO, plus minor constituents as explained below.

The above-mentioned composition was melted in a continuous tank furnace at about 1600° C. In order to maintain oxidizing conditions in the tank during melting, small amounts of $NaNO_3$ and $As_2O_5$ were included in the batch as oxidizing agents, the $As_2O_5$ also functioning as a fining agent. Other conventional oxidizing and fining agents can be substituted, if desired. The residual $Na_2O$ and $As_2O_3$ remaining in the glass amount to about 1.5% of the total composition and have no appreciable effect on the properties of either the glass or its semicrystalline product. For convenience and facilitation of expression, therefore, the composition is expressed in round figures by omitting such minor constituents and rounding off the remaining constituents as indicated.

The modulus of rupture preferably is measured in the conventional manner by supporting individual rods of the semicrystalline product about ¼ inch in diameter and 4 inches long on 2 knife edges spaced 3½ inches apart and loading them on 2 downwardly acting knife edges about ¾ inch apart and centrally spaced from the lower knife edges until breakage of the rods occurs. To insure comparable results the rods are first abraded by being rolled for 15 minutes in a ball mill with 30 grit silicon carbide. Five or more rods are thus tested individually to obtain the average value which is calculated in p.s.i.

The method of measuring the linear thermal expansion coefficients of glasses and semicrystalline ceramics is so well known as to require no discussion here. The measured expansion coefficient of the above-described composition in the vitreous state is about $34 \times 10^{-7}$ per ° C. between 0° and 300° C.

The measurement of deformation is made with rods ¼ inch in diameter and 5 inches long which, during the heat treatment, are mounted on refractory supports spaced 4 inches apart. Measurement of the bow or sag of the rods between the supports as a result of the heat treatment is made by means of a gage consisting of knife edges 4 inches apart and a dial gage with a knife edge tip mounted midway between and below the knife edges. The sagged rod is placed on the knife edges of the gage convex side down and as closely as possible to the points which were in contact with the refractory supports during the heat treatment. The deflection of the mid point of the convex side of the rod from the plane of the two knife edges of the gage is indicated on the dial in mils.

In order to illustrate the invention, glass rods 5 inches long having the above-recited specific composition and having diameters of ¼ inch and ½ inch, respectively, were treated as follows: with the ¼ inch rods vertically suspended and the ½ rods laid flat, they were subjected to a heat treatment consisting of heating them at 7° C. per minute to 800 C., holding them at such temperature for 1 hour, further heating them at 1° C. per minute to 1000° C., holding them at that temperature for 10 hours, further heating them at 1° C. per minute to 1175° C. and holding them at the latter temperature for 4 hours. By measurement of the ¼ inch rods the average modulus of rupture (abraded) was found to be 20,260 p.s.i., the expansion coefficient $5.1 \times 10^{-7}$ per ° C. and the deformation 0.286 inch.

The ½ inch diameter semicrystalline rods were centerless ground to ¼" diameter and the average modulus of rupture was measured and found to be 11,410 p.s.i., amounting to a loss of 8,850 p.s.i. from the original value. The ground ¼ inch rods were then reheat treated while vertically suspended by heating to 1100° C. and holding them at that temperature for 4 hours, after which the average modulus of rupture (abraded) was 20,070 p.s.i., the expansion coefficient was $7 \times 10^{-7}$ per ° C. between 0° and 300° C. and deformation of the reheat treated ground rods was 0.003 inch. In the reheat treatment the semicrystalline body may be heated as rapidly as desired on account of its low expansion coefficient which renders it highly resistant to thermal shock.

What is claimed is:

1. In the method of making a semicrystalline ceramic body by preliminarily heating a glass body in a first temperature range in the neighborhood of and above its annealing point to initiate the crystallization thereof and finally heating it in a substantially higher, second temperature range for a time sufficient to bring about adequate crystallization of the body and to form a compression layer on its surface, thereafter removing surface portions of the body to provide it with predetermined accurate dimensions and at least partially to remove said compression layer thereby lowering its modulus of rupture, the step which comprises reheating the accurately dimensioned body in said second temperature range for a time sufficient to restore the compression layer on its surface.

2. The method of claim 1 in which the glass body comprises by weight 55–75% $SiO_2$, 3–7% $TiO_2$, 2–15% $Li_2O$ and 12–36% $Al_2O_3$, the weight ratio $Li_2O/Al_2O_3$ being 0.1 to 0.6, the total $SiO_2$, $TiO_2$, $Li_2O$ and $Al_2O_3$ being at least 95%.

3. The method of claim 1 in which the glass body consists essentially by weight of about 71% $SiO_2$, 4.5% $TiO_2$, 2.5% $Li_2O$, 18% $Al_2O_3$, 3% MgO and 1% ZnO and is reheated to about 1100° C. after it is held at that temperature for about 4 hours after surface portions of the body have been removed.

References Cited in the file of this patent

UNITED STATES PATENTS

| 2,691,855 | Armistead | Oct. 19, 1954 |
| 2,854,794 | Luedeman | Oct. 7, 1958 |

FOREIGN PATENTS

| 686,246 | Great Britain | June 21, 1953 |
| 167,681 | Australia | May 9, 1954 |

OTHER REFERENCES

Article by N. M. Pavlushkin titled: "Properties of Some Magnesia—Alumina Glasses" as appeared in the May 1958 edition of "The Glass Industry," page 275.